United States Patent [19]

Hickey et al.

[11] Patent Number: 5,724,185
[45] Date of Patent: Mar. 3, 1998

[54] METHOD FOR OPTICALLY CONTACTING SURFACES STRESSED BY AN OPTICAL COATING

[75] Inventors: Carolyn F. Hickey, Acton; Robert O. Woodbury, Westford; Dale A. Allen, Marlboro, all of Mass.

[73] Assignee: Hughes Danbury Optical Systems, Inc., Danbury, Conn.

[21] Appl. No.: 516,342

[22] Filed: Aug. 17, 1995

[51] Int. Cl.$^6$ .............................. G02B 1/10; B32B 31/00; B05D 5/06

[52] U.S. Cl. .......................... 359/500; 359/582; 359/900; 156/99; 156/102; 156/153; 65/43; 65/61; 427/162

[58] Field of Search ........................ 359/900, 580, 359/582, 496, 500; 156/99, 102, 151, 153, 160; 65/42, 43, 61

[56] References Cited

U.S. PATENT DOCUMENTS

| | | | |
|---|---|---|---|
| 2,420,270 | 5/1947 | Thomas | 359/580 |
| 4,810,318 | 3/1989 | Haisma et al. | 156/153 |
| 5,175,736 | 12/1992 | Woodward et al. | 372/9 |
| 5,339,441 | 8/1994 | Kardos et al. | 359/359 |
| 5,453,338 | 9/1995 | Suga et al. | 359/12 |
| 5,563,899 | 10/1996 | Meissner et al. | 372/35 |
| 5,592,288 | 1/1997 | Sampica et al. | 356/62 |

FOREIGN PATENT DOCUMENTS 848 716  9/1952  Germany .................. 359/588

OTHER PUBLICATIONS

Smith, H.I., et al., "Adhesion of Polished Quartz Crystals Under Ultrahigh Vacuum," *Communications*, pp. 2326–2327 (recieved 18 Dec. 1964).

Antonov, R.P., et al., "Silicone Compounds for Optical Contact," *Instruments and Experimental Technigues*, (6):1577–1579 (Nov. 1969).

Holt, R.B., et al., "Research on Optical Contact Bonding," *Defense Technical Information Center*, Document No. AD643285, Final Report (May 1966).

MacLeod, H.A., "Thin–Film Optical Filters," *Macmillan Publishing Company*, New York, pp. 150–151, 328–333, 356–357 (1986).

Smartt, R.N., et al. "On the Production and Use of the Optical Contact Bond," *J. Sci. Instrum.*, vol. 41:514 (1964).

Karow, H.H., "Fabrication Methods for Precision Optics," *Wiley Series in Pure and Applied Optics*, pp. 560–563 (1993).

Smith, H.I., "Optical–Contact Bonding," *Journal of Acoustical Society of America*, 37(5):928–929 (May 1965).

*Primary Examiner*—Paul M. Dzierzynski
*Assistant Examiner*—John Juba, Jr.
*Attorney, Agent, or Firm*—W. C. Schubert; W. K. Denson-Low

[57] ABSTRACT

In the method and apparatus of the present invention, a first optical element having a surface stressed by an optical coating is optically contacted with a second optical element. The first optical element is treated with a frequency or polarization selective coating which causes deformation of the treated surface. A pliable intermediate optical element is joined with the coated surface. The intermediate element is sufficiently pliable to substantially conform to the contour of the coated surface, providing optical contact therebetween. An opposite face of the intermediate element is polished and a second optical element is optically contacted to the intermediate element. This provides a precise and economical method for joining two optical elements, one of which is treated with an optical coating.

14 Claims, 2 Drawing Sheets

METHOD FOR OPTICALLY CONTACTING SURFACES STRESSED BY AN OPTICAL COATING

BACKGROUND OF THE INVENTION

Optical components such as beam splitters and filters can be formed by adhering two optical elements together with a frequency or polarization selective coating layer therebetween. Adhering the two parts is often necessary to achieve the desired optical performance or to protect the coating from the environment. The indices of refraction of the incident and emergent optical media on each side of the coating are important parameters in achieving efficient operation. If a foreign substance, such as air, is present between the coating and either optical medium, then the optical performance of the device is compromised. Optical contacting is a well-known and preferred method for joining the elements, because it provides strong contact forces, without introducing the absorption and scatter of conventional adhesives.

Stresses inherent in the coating can cause the treated surface to become distorted or warped. Surface distortion interferes with optical contacting. To overcome this problem, the optical element to be mounted on the coated element can be ground or otherwise distorted to match the distortion of the coated element, thereby providing well-matched mating surfaces for optical contact. However, this can be a complicated and expensive procedure, as the distortion of the coated element is both difficult to predict and difficult to match to a mating surface. This method for optical contacting does not lend itself well to a manufacturing process which requires low cost, high yield, and/or predictability in forming the optical elements.

Optical contacting is a process which is well known to those skilled in the field of optics. There are varied theories for the mechanism of optical contacting. In one theory, the surfaces are held together by the surface tension of a very thin layer of water (or other liquid) located between the two surfaces. In another theory, mechanical seizure between the two surfaces occurs because two surfaces in close proximity tend to share a weak contact force (which has been described as the result of sharing electrons, or of sharing electromagnetic fields, or of Van der Waals forces, or of London dispersive forces). When the region of contact has sufficient surface area, a strong contact force is obtained by the cumulative effect of this weak interaction. It has been postulated that in practice, under conditions of greater than 50% relative humidity, a combination of both the surface tension and contact force theories apply. The region of contact between the surfaces must be substantially devoid of impurities, for example dust particles and water stains, to provide for the strongest bond. An absence, or near absence, of air is also necessary to eliminate or greatly reduce optical reflections at the contacted surfaces.

It is common in the art for various surfaces of optical elements to be treated with an optical coating which provides frequency or polarization selective properties. The coating can be reflective or transmissive of selected electromagnetic waves. For example, beam splitter coatings, filter coatings, antireflection coatings, reflective coatings, and multi-spectral coatings can be deposited on the optical element to produce any desired effect, for example, beam splitting or filtering. In many of these coatings, the absence of air is necessary to achieve the desired filter properties of the coating.

It is also well known in the art that upon deposition, the optical coating contains inherent stresses which deform the treated surface of the optical element. This is especially true for prisms where it is common for the perimeter of the treated surface to be much thinner than the center of the treated surface. This causes the edges to be much more susceptible to deformation.

SUMMARY OF THE INVENTION

The present invention is directed to a method and apparatus provided for optically contacting a first optical element coated with a frequency or polarization selective coating to a second optical element in a manner which overcomes the above-described limitations. The method of the invention comprises first depositing a frequency or polarization selective coating on a surface of a first optical element. Next, a pliable second optical element having first and second faces is mounted on the coated surface of the first element. The contour of the first face of the second element substantially conforms to the contour of the coated surface of the first element to provide optical contact therebetween.

In a preferred embodiment, the second face of the second element is polished to a predetermined profile and a third optical element having a mating surface to that of the second face of the second element is mounted thereon. The mating surface of the third element substantially conforms to the profile of the second element thereby providing optical contact therebetween. The profile is preferably flat. The second element is preferably formed with a high aspect ratio, for example, greater than five, providing requisite flexibility for conforming to the deformed surface of the coated optical element.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The present invention is directed to a method and apparatus for optically contacting optical elements, one of which is treated with a frequency or polarization selective optical coating. The resulting structure comprises a base element and mounting element which are each optically contacted to an intermediate element. The base element is treated with an optical coating. The term "optical coating" as used herein includes coatings which are frequency and/or polarization selective. Stresses inherent in the optical coating cause the treated surface of the base element to become distorted. In accordance with the invention, a pliable intermediate element is mounted on the treated face of the base element and conforms to the distorted surface, thereby providing optical contact to the base element. The intermediate element is then polished flat to mate with a flat surface of the mounting element, thereby providing optical contact therebetween.

Figure 1A:
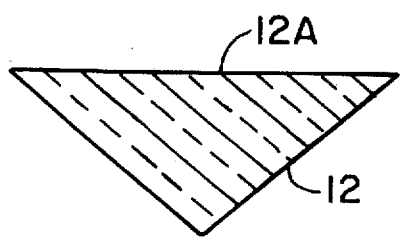
FIGS. 1A–1C illustrate a prior art process for bonding an optical mounting element to an optical base element having a frequency or polarization selective coating.
Figure 1B:
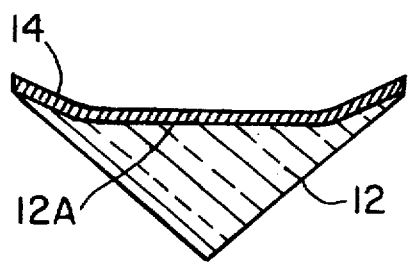
Figure 1C:
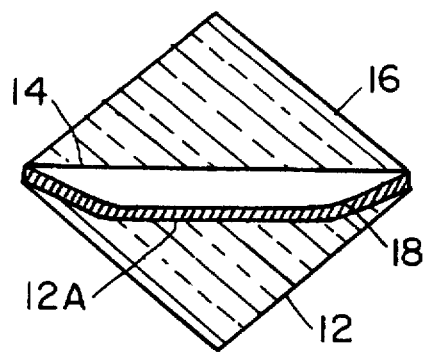

FIG. 1A is an illustration of an optical element such as a prism 12 having a surface 12A to be treated with an optical coating. The coating 14 causes a deformation of the element 12, as shown in exaggerated form in FIG. 1B. The actual resulting shape of the deformation depends upon the inherent material properties of the base element 12 whose surface 12A is treated, the stresses inherent in the coating 14, and the degree to which the coating 14 adheres to the treated surface 12A. As shown in FIG. 1C, if a mounting element 16 is mounted on the deformed base element 12, an air gap 18 remains therebetween. If the air gap 18 is large enough, optical contact may not be possible. Optical contact can only be achieved in this manner if the coating stress is low enough to introduce negligible deformation in the coated element. Otherwise, undesirable adhesives will have to be used.

Figure 2A:
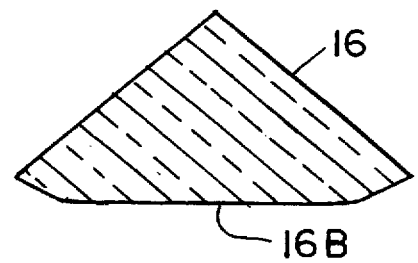
FIGS. 2A–2B illustrate a process in accordance with a first embodiment of the invention for achieving optical contact between an optical mounting element and a coated optical element.
Figure 2B:
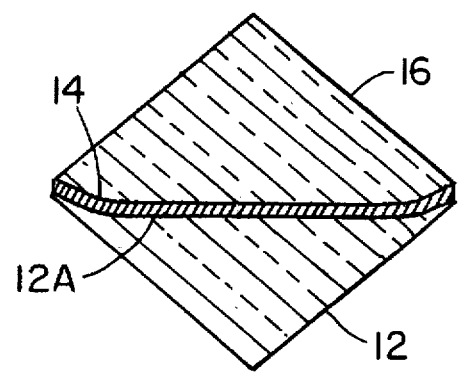

To overcome this problem, the contacting surface 16B of the mounting element 16 can be formed to match the distorted profile 12A of the treated base element 12 as shown in FIGS. 2A and 2B. In this manner, the mounting element 16 will optically contact the base element 12, without a remanent air gap 18 therebetween. This is an expensive approach, however, since the shape is probably aspherical and since it is difficult to predict the distortion of the base surface 12A due to unrepeatable and unknown inherent stresses in the coating 14. These stresses can vary between production lots, causing the distortion to vary a significant amount. Furthermore, even if the degree of distortion 12A were predictable, it would be difficult and expensive to grind and polish a mating distorted surface 16B on the mounting element 16.

Figure 3A:
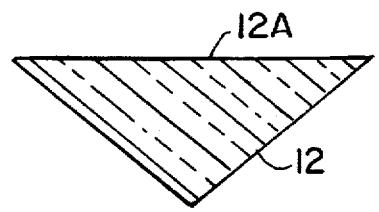
FIGS. 3A–3E illustrate a process for optically contacting an optical mounting element to a coated base element with a pliable intermediate element in accordance with a preferred embodiment of the present invention.
Figure 3B:
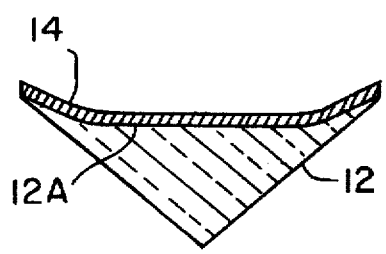

The preferred embodiment of the present invention overcomes the limitations described above. A base optical element 12 is formed with a contacting surface 12A having a predetermined profile, preferably flat as shown in FIG. 3A. In FIG. 3B, the surface 12A is treated with an optical coating 14 by any of the various well known coating deposition techniques. Inherent stress in the deposited coating causes a distortion in the optical surface 12A of the base element 12.

Figure 3C:
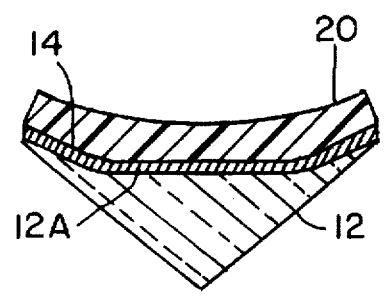

As shown in FIG. 3C, a pliable intermediate optical element 20 is mounted on the coated surface 12A of the base element 12. The intermediate element 20 is flexible and formed with a high aspect ratio.

Aspect ratio is defined as the ratio of the longest surface length to the thickness of the piece. It determines, along with the material properties, the degree to which an element is capable of distorting. The greater the distortion 12A of the base element 12, the higher the desired aspect ratio of the intermediate element 20. The preferred aspect ratio is such that the element must be thicker than the sag due to distortion caused by the coating, and at the same time must be pliable enough to conform to the distorted surface.

As an example, a circular element with a 1 inch diameter and a thickness of 0.04 inches has an aspect ratio of 25. An intermediate element with an aspect ratio of 25 would achieve optical contact with a base element having 5.0 micrometers of sag distortion.

The optical coating 14 is preferably thin, for example 0.5 micrometers; is relatively smooth, for example less than 100 Angstroms rms roughness; and is of sufficient mechanical integrity to withstand the process of optical contacting. The coating 14 performance is determined in part by the indices of refraction of the optical media in contact therewith. Because the intermediate element 20 conforms to the distorted surface 12A of the base element 12, substantially minimal impurities such as air remain in the junction therebetween. In this way, the coating 14 operates in a predictable manner as the indices of refraction of the incident medium 12 and emergent medium 20 are known and predictable, and the effect of impurities, for example air, in the junction are minimized.

Figure 3D:
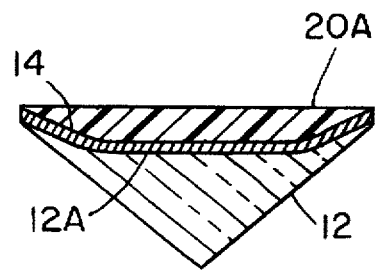
Figure 3E:
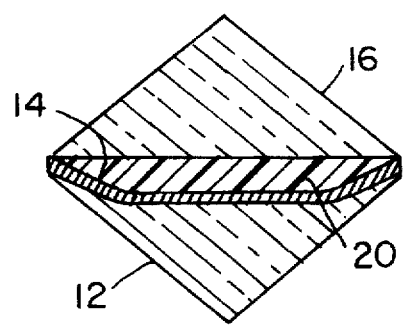

In FIG. 3D, the surface 20A of the intermediate element 20 opposite that which is contacted to the deformed surface 12A, is prepared for optical contact with a mounting element 16 as shown in FIG. 3E. The simplest and most straightforward method for providing optical contact between the intermediate element 20 and mounting element 16 is to polish the contacting surfaces 20A flat. In FIG. 3E, a flat surface of the mounting element 16 is brought into optical contact with the intermediate element 20.

In this manner, a base element 12 treated with an optical coating is brought into optical contact with a mounting element 16, by virtue of a pliable intermediate element 20.

The base element 12, intermediate element 20, and mounting element 16 may comprise similar or different materials. Preferred materials include: glass; semiconductors; infrared materials, for example zinc sulfide or zinc selenide; crystalline materials for example sapphire and calcium fluoride; and polymers used in optics. Preferred substances for forming mirrors include Pyrex™, ULE™, and Zerodur™.

While this invention has been particularly shown and described with references to preferred embodiments thereof, it will be understood by those skilled in the art that various changes in form and detail may be made herein without departing from the spirit and scope of the invention as defined by the appended claims.

We claim:

1. A method for optically contacting an optically coated optical element comprising the steps of:

forming an optical coating on a surface of a first optical element, said coating causing said surface to deform; and joining a second optical element having first and second faces with said coated surface of said first optical element; said second element being sufficiently pliable such that said first face of said second element substantially conforms to said deformed coated surface to provide optical contact therebetween;

polishing said second face of said second optical element to a predetermined profile; and joining a third optical element having a surface which substantially conforms to said predetermined profile of said second element with said second face of said second element to provide optical contact therebetween.

2. The method of claim 1, wherein the step of polishing further comprises polishing said second face of said second element substantially flat and wherein said third optical element has a substantially flat surface which joins with said second element to provide optical contact therebetween.

3. The method of claim 1, further comprising the step of determining the pliability of said second element by its aspect ratio.

4. The method of claim 3, wherein the aspect ratio is greater than 5.

5. The method of claim 1, wherein the step of depositing an optical coating causes deformation in the first element due to inherent stresses in the coating.

6. The method of claim 1 wherein the optical coating is frequency selective.

7. The method of claim 1 wherein the optical coating is polarization selective.

8. A method for optically contacting an optically coated optical element to an uncoated element comprising the steps of:

forming an optical coating on a surface of a first optical element;

joining a second optical element having first and second faces with said coated surface; said second element being sufficiently pliable such that said first face of said second element substantially conforms to said coated surface of said first element to provide optical contact therebetween;

polishing said second face of said second element to a predetermined profile; and joining a third optical element having a surface which substantially conforms to said predetermined profile of said second element with said second face of said second element, to provide optical contact therebetween.

9. The method of claim 8, wherein the step of polishing further comprises polishing said second face of said second element substantially flat and wherein said third element has a flat surface which joins with said second element to provide optical contact therebetween.

10. The method of claim 8, further comprising the step of determining the pliability of said second element by its aspect ratio.

11. The method of claim 10, wherein the aspect ratio is greater than 5.

12. The method of claim 8, wherein the step of depositing an optical coating causes deformation in the first element due to inherent stresses in the coating.

13. The method of claim 8 wherein the optical coating is frequency selective.

14. The method of claim 8 wherein the optical coating is polarization selective.

* * * * *